(No Model.)
J. T. ELLYSON.
PLOW.
No. 292,998. Patented Feb. 5, 1884.
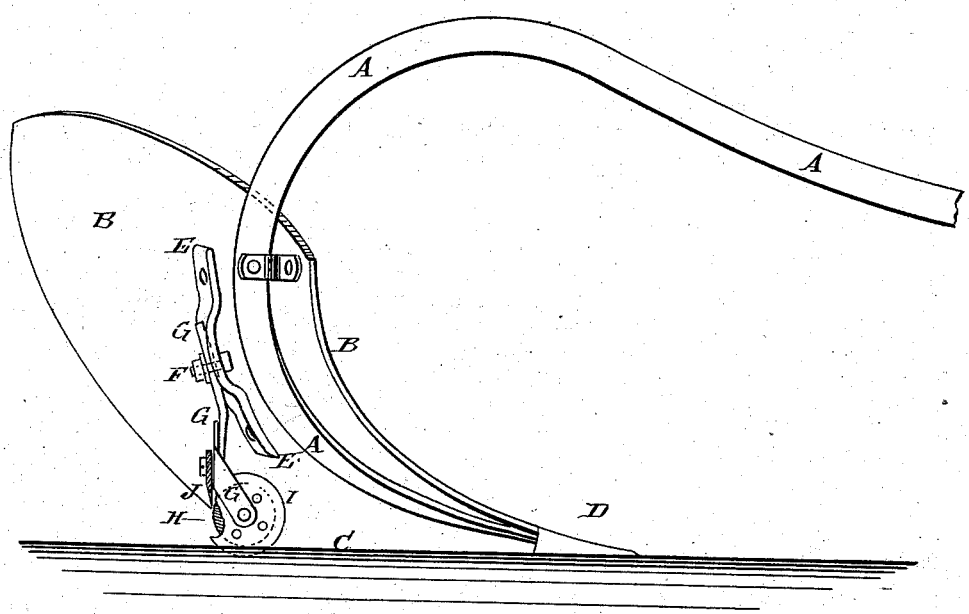
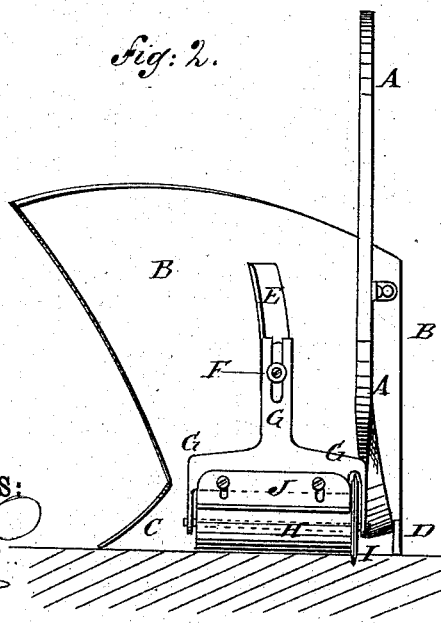
WITNESSES:
Chas. Niell
C. Sedgwick
INVENTOR:
J. T. Ellyson
BY Munn & Co
ATTORNEYS.

UNITED STATES PATENT OFFICE.

JOHN T. ELLYSON, OF PLEASANT PLAIN, IOWA.

PLOW.

SPECIFICATION forming part of Letters Patent No. 292,988, dated February 5, 1884.

Application filed December 6, 1883. (No model.)

*To all whom it may concern:*

Be it known that I, JOHN T. ELLYSON, of Pleasant Plain, in the county of Jefferson and State of Iowa, have invented certain new and useful Improvements in Plows, of which the following is a full, clear, and exact description.

Reference is to be had to the accompanying drawings, forming part of this specification, in which similar letters of reference indicate corresponding parts in both the figures.

Figure 1 is a side elevation of a plow to which my improvement has been applied, part being broken away. Fig. 2 is a rear elevation of the same.

My invention relates to that class of plows having a roller, disk, and scraper secured adjustably in rear of the mold-board; and the invention consists in certain details in the means of adjusting and securing the plate carrying the roller, disk, and scraper.

A represents the beam, B the mold-board, C the share, and D the point, of an ordinary plow.

To the middle part of the rear side of the mold-board B is secured, by rivets or other suitable means, a bar, E, the middle part of which is raised to form a space to receive the head of the bolt F. The bolt F passes through the bar E and through a slot in the standard G, and has a nut screwed upon its outer end, so that by loosening the said nut the said standard can be moved up and down. The lower end of the standard G is forked, and to its arms are pivoted the ends of the roller H, which rests upon the bottom of the furrow and supports the downward pressure of the plow, preventing any friction between the plow and the said bottom of the furrow.

To the landside end of the roller H is attached a steel disk, I, of a greater diameter than the said roller, so that the projecting edge of the said disk will enter the bottom of the furrow and resist the side pressure of the plow, and prevent any friction between the said plow and the side of the furrow. With this construction, by loosening the bolt F, the standard G and roller H can be raised as the plow wears, so that the said roller can always be kept in suitable position to properly support the said plow.

To the rear side of the standard G is attached a plate, J, the lower edge of which overlaps the upper rear side of the roller H, to scrape off any soil that may adhere to the said roller, and thus prevent the roller from being enlarged by the accumulation of soil and raising the plow too high. The scraper J is slotted to receive the fastening-bolts, so that it can be readily adjusted as may be required. The bar E strengthens the mold-board B, supports the roller H, and allows the standard G to be adjusted to throw the outer end of the said roller forward or back, to cause the plow to take or leave land, as may be desired.

Having thus described my invention, what I claim as new, and desire to secure by Letters Patent, is—

The combination, with the mold-board B, having the flanged bar E secured thereto, of slotted forked plate G, carrying the roller, disk, and scraper at its forked end, and a bolt on the flanged bar E, for adjustably securing the slotted upper end of the plate G, substantially as set forth.

JOHN T. ELLYSON.

Witnesses:
R. S. MILLS,
ISAAC PARKER.